(12) United States Patent
Crouch et al.

(10) Patent No.: US 11,897,600 B2
(45) Date of Patent: Feb. 13, 2024

(54) TRIP DEVICE FOR ENHANCING PERFORMANCE AND HANDLING QUALITIES OF AN AIRCRAFT

(71) Applicant: The Boeing Company, Chicago, IL (US)

(72) Inventors: Jeffrey D. Crouch, Issaquah, WA (US); Mary Indriani Sutanto, Redmond, WA (US); Gregory Dennis Miller, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 473 days.

(21) Appl. No.: 16/457,664

(22) Filed: Jun. 28, 2019

(65) Prior Publication Data
US 2020/0407046 A1    Dec. 31, 2020

(51) Int. Cl.
*B64C 23/04* (2006.01)
*B64C 23/06* (2006.01)

(52) U.S. Cl.
CPC .............. *B64C 23/04* (2013.01); *B64C 23/06* (2013.01)

(58) Field of Classification Search
CPC ......... B64C 23/04; B64C 23/06; B64C 21/00; B64C 3/58; B64F 5/10; Y02T 50/10
See application file for complete search history.

(56) References Cited

U.S. PATENT DOCUMENTS

| 4,354,648 | A  | * | 10/1982 | Schenk | B64C 21/10 244/200.1 |
| 5,651,516 | A  | * | 7/1997  | Mihora | B64C 23/04 244/91 |
| 7,954,767 | B2 | * | 6/2011  | Crouch | B64C 21/10 244/200 |
| 9,334,045 | B2 | * | 5/2016  | Wood   | B64C 23/04 |
| 9,463,870 | B2 | * | 10/2016 | Wood   | B64C 23/04 |

(Continued)

FOREIGN PATENT DOCUMENTS

| DE | 3779550    | 1/1993 |
| EP | 0264144 B1 | 6/1992 |

(Continued)

OTHER PUBLICATIONS

Timmer et al, Aerostructural Optimization of a Low Sweep Transonic Wing with Shock Control Bump, Jan. 2016, AIAA (Year: 2016).*

(Continued)

*Primary Examiner* — Medhat Badawi
*Assistant Examiner* — Vicente Rodriguez
(74) *Attorney, Agent, or Firm* — Kwan & Olynick LLP (57) ABSTRACT

An aircraft wing is disclosed herein having a fixed-location trip device placed along the span of the wing to transition airflow from laminar flow to turbulent flow so that potential load increases are limited and flight performance uncertainties associated with laminar flow wings are reduced. Wings designed for extended laminar flow offer the potential to significantly reduce airplane drag and fuel consumption. A collateral impact of a laminar flow wing is the generation of elevated wing loads at critical load conditions. This impact is mitigated by controlling the downstream limit of transition at these critical load conditions.

20 Claims, 6 Drawing Sheets

(56) References Cited

U.S. PATENT DOCUMENTS

| | | | |
|---|---|---|---|
| 2005/0163963 A1* | 7/2005 | Munro | F15D 1/12 |
| | | | 428/90 |
| 2006/0060720 A1* | 3/2006 | Bogue | B64C 39/12 |
| | | | 244/200 |
| 2009/0090814 A1* | 4/2009 | Barbara | B64D 15/04 |
| | | | 244/134 B |
| 2010/0301172 A1 | 12/2010 | Wood | |
| 2017/0096214 A1* | 4/2017 | Stefes | B64C 9/02 |
| 2017/0253321 A1 | 9/2017 | Rolston | |

FOREIGN PATENT DOCUMENTS

| | | |
|---|---|---|
| EP | 2810870 A1 | 12/2014 |
| EP | 3213991 A1 | 9/2017 |
| WO | 2015024601 A1 | 2/2015 |
| WO | 2015198093 A1 | 12/2015 |

OTHER PUBLICATIONS

European Application Serial No. 20169831.3, Search Report dated Oct. 8, 2020, 15 pgs.

Stanewsky, E.; Adaptive Wing and Flow Control Technology, Progress in Aerospace Sciences, vol. 37 No. 7, Oct. 1, 2001; pp. 583-667.

European Application Serial No. 20169831.3, Office Action dated Mar. 10, 2022, 6 pages.

\* cited by examiner

TRIP DEVICE FOR ENHANCING PERFORMANCE AND HANDLING QUALITIES OF AN AIRCRAFT

BACKGROUND

1. Field

This disclosure generally relates to aircraft wing efficiency. More specifically, it relates to a fixed-location trip device along the span of a wing to provide control of laminar and turbulent boundary layer flow.

2. Description of the Related Art

Commercial transport aircraft manufactures are under continual pressure to increase operating efficiency of passenger and cargo aircraft. A major component of operating costs is fuel and two major contributors to aircraft fuel consumption are aerodynamic drag and aircraft weight. Manufacturers have sought techniques and apparatus for reducing drag while maintaining critical loads and not increasing weight.

One technique is maintaining laminar boundary layer flow over the wing which reduces drag. Laminar flow control on an aerodynamic surface reduces drag and improves fuel efficiency by delaying the transition to turbulent flow in the boundary layer on the surface. The transition can be delayed by contouring the aerodynamic surface to promote laminar flow, During design of the wing, changes to increase the extent of laminar flow are balanced against increases in other contributors leading to performance inefficiencies, such as aerodynamic shock strength and airplane/wing weight. One design factor is ensuring that by increasing the extent of laminar flow, the weight of the wing does not increase by having to make the wing stronger to account for extreme load conditions.

The extent of laminar flow is balanced with the potential for excessive load on the wing in extreme load conditions or, more broadly, non-cruise conditions. The potential for excessive load on a wing, which is taken into account when designing the wing, requires that the wing be able to withstand extreme or worst-case scenarios. In other words, that the wing be strong enough to handle extreme load conditions. Making the wing stronger or reinforced adds weight to the aircraft, which can quickly counteract any advantages gained from reduced drag from laminar flow.

Accordingly, there is a need for improving aerodynamic efficiency by maintaining laminar flow at cruise conditions while handling worst-case conditions without increasing weight of the wing. There is also a need to be able to gather more accurate load, control effectiveness, and handling-quality data during on-ground wind tunnel testing of a laminar flow wing. This data can be used for airplane design before in-flight testing of the airplane.

SUMMARY

One aspect disclosed is a method of operating an aircraft with a wing having a trip device at a fixed location along the span of the wing. When the aircraft is in flight and the wing moves through a transonic airflow such that air passes over a wing surface creating a laminar boundary layer. When the airflow is downstream of the trip device, a turbulent boundary layer is created. The laminar boundary layer before the trip device extends for a certain length and the turbulent boundary layer extends for another certain length. The trip device is at a trip location that is aft of the laminar boundary layer, such that the trip location enables laminar flow for the length of the laminar boundary layer to increase aerodynamic efficiency and enables turbulent flow for the length of the turbulent boundary layer, thereby decreasing loads on the wing and providing a fixed aft limit on the transition from the laminar boundary layer to the turbulent boundary layer.

Another aspect disclosed is a method of manufacturing a wing having a trip device. A naturally occurring target transition location under normal cruise conditions is identified along a chordwise direction of the airfoil surface. Multiple target transition locations are predicted under various design conditions. A target transition location that is most aft or downstream from the multiple target transition locations is identified. As such, a shock occurrence on the wing is downstream of the identified most-downstream target transition location along the chord of the airfoil. The trip device is incorporated along a spanwise direction of the wing at a selected length aft of the most-downstream target transition location.

Another aspect disclosed is an aircraft wing having a trip device along the span of the wing. The device is located at a selected length aft of a target transition location along a chord of an airfoil of the wing. The trip device prevents downstream movement of transition from laminar flow to turbulent flow and associated movement of a shock location on the wing. The trip device location on the airfoil of the wing varies along the span of the wing.

Illustrative, non-exclusive examples of inventive features according to present disclosure are described in following enumerated paragraphs:

A1. Method of operating 500 an aircraft 100, the method comprising:
  moving a wing 102 having a fixed-location trip device 108 along a span of the wing 102 through an airflow such that air passing over a wing surface creates a laminar boundary layer 302; and
  creating a turbulent boundary layer 308 when the airflow is downstream of the fixed-location trip device 108, wherein the laminar boundary layer 302 extends for a first length and the turbulent boundary layer extends for a second length, wherein the fixed-location trip device 108 is at a trip device location that is aft of the laminar boundary layer, such that the trip device location enables laminar flow for the first length to increase aerodynamic efficiency and enables turbulent flow for the second length to decrease loads on the wing 102, thereby providing a fixed aft limit on a transition from laminar boundary layer 302 to turbulent boundary layer 308.

A2. Method 500 of paragraph A1 wherein the trip device location is aft of a target transition location 106.

A3. Method 500 of paragraph A1 wherein the trip device location is at a target transition location 106.

A4. Method 500 of paragraph A1 wherein the trip device location is upstream of a target transition location 106.

A5. Method 500, 508 of paragraph A1 further comprising:
  reducing shock movement on the wing 102 wherein the fixed-location trip device 108 reduces downstream movement of the transition and an associated movement of shock location on the wing 102 during transonic airflow.

A6. Method 500 of paragraph A1 wherein the trip device location decreases variation of aerodynamic force for one of a specific flight parameter and condition.

A7. Method 500 of paragraph A1 wherein the fixed-location trip device 108 is a continuous trip strip along the span of the wing 102.

A8. Method 500 of paragraph A1 wherein the fixed-location trip device 108 is a plurality of discrete elements along the span of the wing 102.

A9. Method 500 of paragraph A1 wherein trip device dimension varies along the span of the wing 102.

A10. Method 500 of paragraph A1 wherein the trip device location on an airfoil 104 of the wing 102 varies along the span of the wing 102.

A11. Method 500 of paragraph A1 wherein the fixed-location trip device 108 is along on an upper surface of the wing 102.

A12. Method 500 of paragraph A11 wherein the fixed-location trip device 108 is along either side of a vertically oriented wing surface.

A13. Method 400 of manufacturing a wing 102 comprising:
identifying a first target transition location along a chordwise direction of an airfoil 104 surface under cruise condition; predicting a plurality of target transition locations under a plurality of design conditions 404; identifying a most-downstream target transition location 106 from the plurality of target transition locations, such that a shock occurrence 110 is downstream of the identified most-downstream target transition location 106 along a chord of the airfoil 104 surface; and
incorporating a trip device 108 along a spanwise direction of the wing 102 at a selected length aft of the most-downstream target transition location 106.

A14. Method 400 of paragraph A13 wherein a trip device location decreases variation of aerodynamic forces between flight conditions.

A15. Method 400 of paragraph A13 wherein the trip device 108 is a continuous trip strip.

A16. Method 400 of paragraph A13 wherein the trip device 108 is a plurality of discrete elements.

A17. Method 400 of paragraph A13 wherein a trip device 108 dimension and a trip device location vary along the spanwise direction of the wing 102.

A18. Aircraft 100 wing 102 comprising:
a trip device 108 along a span of the wing 102, wherein a trip device location is aft of a target transition location 106 along a chord of an airfoil 104 of the wing 102, wherein the trip device 108 prevents downstream movement of transition from laminar flow to turbulent flow and associated movement of a shock location on the wing 102, and wherein the trip device location on the airfoil 104 of the wing varies along the span of the wing 102.

A19. Aircraft 100 wing 102 of paragraph A18 wherein the trip device (108) is a continuous trip strip along the span of the wing 102.

A20. Aircraft 100 wing 102 of paragraph A18 wherein the trip device 108 is a plurality of discrete elements along the span of the wing 102.

A21. Aircraft 100 wing 102 of paragraph A18 wherein the trip device location on an airfoil 104 of the wing 102 varies along the span of the wing 102.

DETAILED DESCRIPTION

In the following description, numerous specific details are set forth in order to provide a thorough understanding of the presented concepts. The presented concepts may be practiced without some of these specific details. In other instances, well known process operations have not been described in detail so as to not unnecessarily obscure the described concepts. While some concepts will be described in conjunction with the specific embodiments, it shall be understood that these embodiments are not intended to be limiting. It is intended to cover alternatives, modifications, and equivalents as may be included within the spirit and scope of the described embodiments as defined by the appended claims.

Methods and systems for operating an aircraft having a wing with a fixed-location trip device are described in the various figures. Methods for determining where to place the trip device along the span of the wing are also described in these figures. Limiting potential load increases and flight performance uncertainties associated with laminar flow wings are also described.

In one embodiment, it is preferred that the shock location or position on the wing is at a position that is consistent with where it would be for a conventional wing without a trip device and where a majority of the wing has a turbulent boundary layer at extreme-load conditions.

There are collateral issues with having extended regions of laminar flow in the boundary layer. In short, it is preferable to set a downstream limit on the extent of laminar flow by placing a trip device at a fixed location along the chord of the wing. In one embodiment, the downstream limit of transition is prescribed as a function of span-wise position on the wing. In short, chord position of the trip device can vary as the trip extends along the span of the wing. In addition to limiting the increase in load that may occur due to extended laminar flow, it provides known limiting values for the extreme load conditions that dictate airplane design structure or critical handling conditions.

In one embodiment, specific flight parameters or design conditions that are of interest are determined. These include Mach, altitude, weight, and other conditions. These are referred to as low-drag design conditions where drag is minimized nominally during cruise. For each of the low-drag design conditions identified, an expected transition position is predicted under these conditions.

For each low-drag design condition there is one transition line along the span of the wing. The position that is most downstream along a chord of the wing considering design conditions is the target transition point. Just aft of the target transition point is the location of the trip device. This provides a fixed aft limit on the transition location.

A shock line is when there is a discontinuity in pressure, low on the upstream side and high on the downstream side. The further downstream the shock line, the greater low pressure area on the wing which causes more lift or load on the wing. Shock is a significant increase in pressure and is very abrupt.

In one embodiment the trip location or transition point is determined by taking into account load and, more specifically, shock location or position. The goal is to control aerodynamic force in extreme load conditions. In such conditions, a laminar boundary layer can adversely affect the shock location or position, so limiting the laminar boundary layer will help limit the load in these cases.

In one embodiment, determining the trip device location enables more systematic and deterministic wind tunnel testing to predict control effectiveness and handling qualities of the plane. The data gathered on the ground about the effectiveness of aerodynamic force controls, loads, etc. becomes a more reliable predictor of these quantities in flight when variability is reduced by means of the determined trip. The wing is designed to withstand high load, so reduced uncertainty in testing with known transition location or specified trip location allows greater confidence in predicting the structural response of a laminar wing prior to building and testing the airplane. In one embodiment, shock movement or shock line movement due to laminar flow is limited by the trip, which thereby limits the amount of load on the wing.

As described above, laminar flow control on an aerodynamic surface reduces drag and improves fuel efficiency by delaying the transition to turbulence in boundary layer on the surface. During the design, changes to increase the extent of laminar flow are balanced against potential increases in other contributors to drag. For operating conditions away from the targeted cruise conditions, the transition can be expected to move fore or aft depending on the specific flow conditions (e.g., altitude, Mach number, weight . . . ). In general, the farther downstream large chord position) the transition occurs, the greater the laminar flow benefit.

Figure 1A:
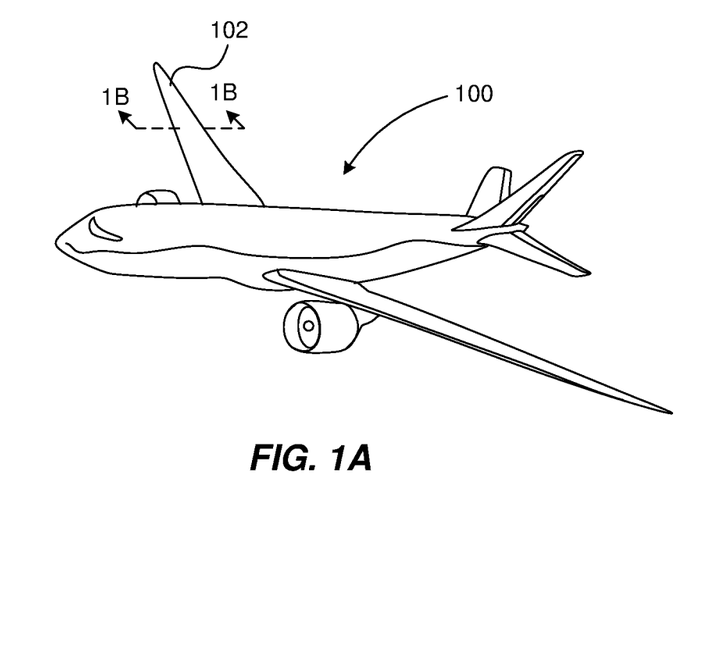
FIG. 1A and FIG. 1B are diagrams of an airplane, airplane wing, and an airfoil with a trip device in accordance with one embodiment.
Figure 1B:
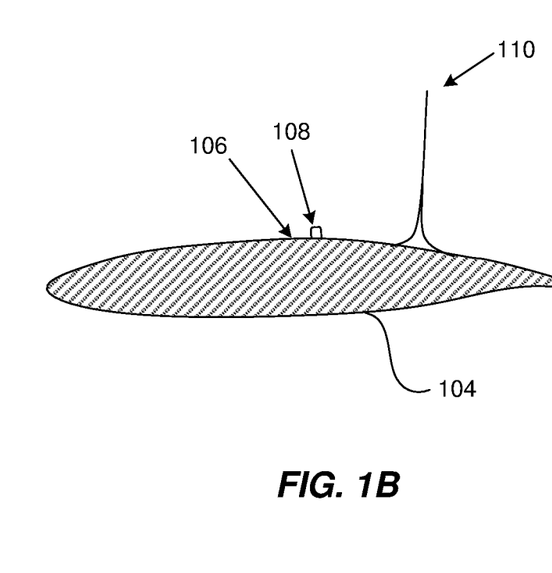
Figure 4:
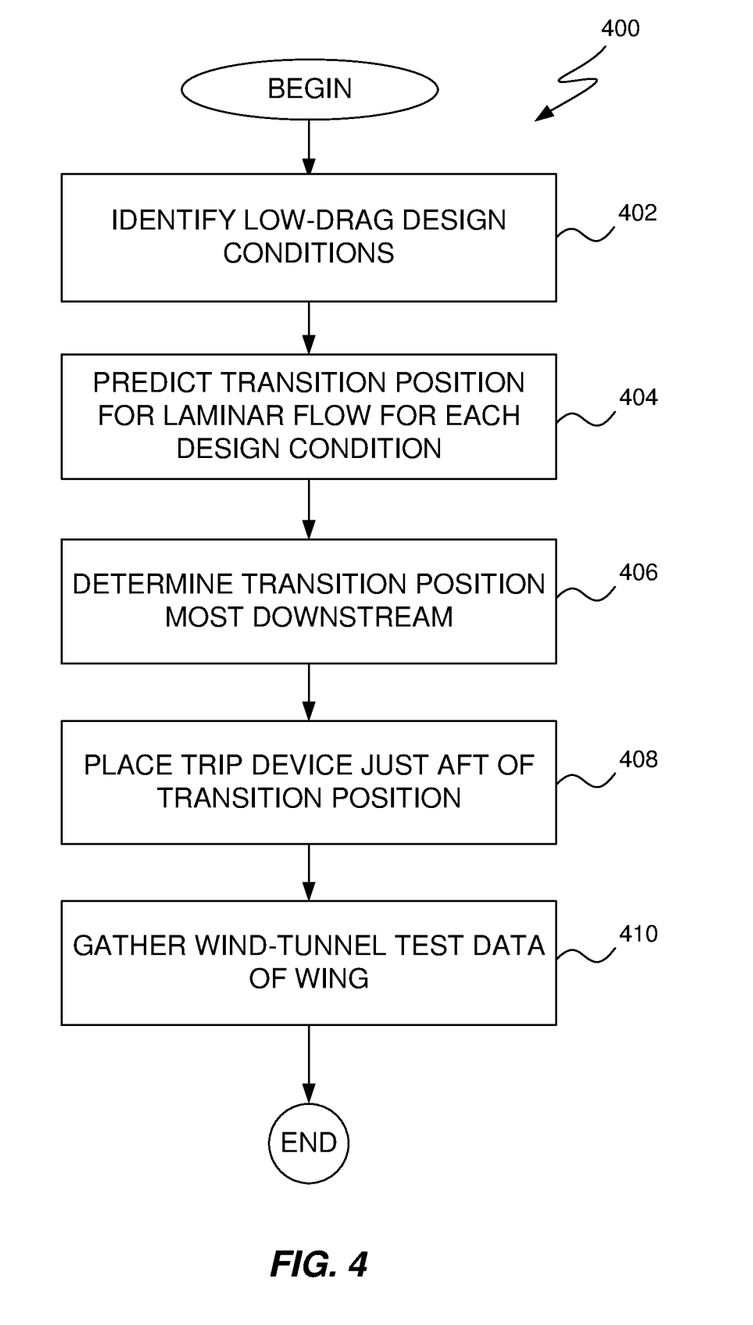
FIG. 4 is a flow diagram showing a process for determining the best location of a trip and gathering test data in accordance with one embodiment.

FIG. 1A is a perspective drawing of an airplane 100 showing a wing 102 and a cross-section of wing 102 or airfoil as shown in FIG. 1B. FIG. 1B is an airfoil 104 of a wing 102 in accordance with one embodiment. On the upper surface of airfoil 104 is a target transition point 106. Target transition point 106 may also be on the lower surface of airfoil 104. This is the point on airfoil 104 where it has been determined that laminar air flow is predicted to transition to turbulent air flow to obtain a beneficial balance between aerodynamic efficiency of the wing (e.g., reducing drag) and being able to adequately handle extreme load conditions (without having to make the wing heavier). Processes for determining where this target transition point 106 are shown in FIG. 4.

Immediately aft of target transition point 106 is a trip 108. The distance between target transition point 106 and trip 108 can vary but is generally small. One factor in determining where target transition point 106 is predicted or expected to be, and in turn where trip 108 is positioned, is the shock line location 110. Shock line location 110 greatly influences or dictates whether wing 102 can meet requirements for handling extreme load conditions. As described above in more detail, as a general principle, the further aft shock line location 110 is, the greater the low pressure area on the upper surface of the wing which, generally, adds stress to the wing in extreme load conditions (e.g., recovering from a sudden drop in altitude or in a steep turn where there can be extremely low pressure on the upper surface of the wing).

Figure 2:
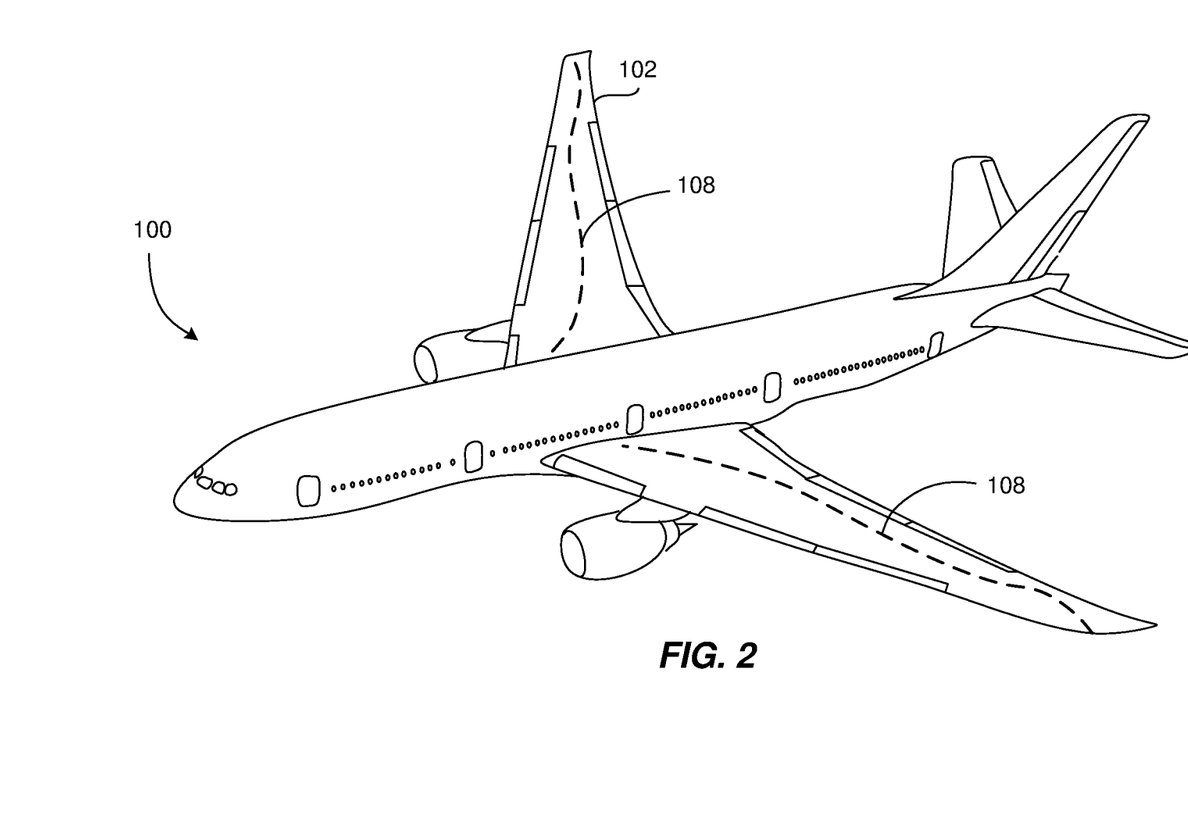
FIG. 2 is a perspective view of an airplane showing a trip device on both wings in accordance with one embodiment.

FIG. 2 is a perspective view of aircraft 100 showing a trip device 108 on both wings in accordance with one embodiment. Trip device 108 shown as dashed line extends spanwise on each wing from the body or fuselage to the tip of the wing. As noted above, the position of trip 108 may vary on each airfoil of the wing. That is, the amount of wing surface fore or aft of trip 108 may be different along the span of the wing.

Figure 3:
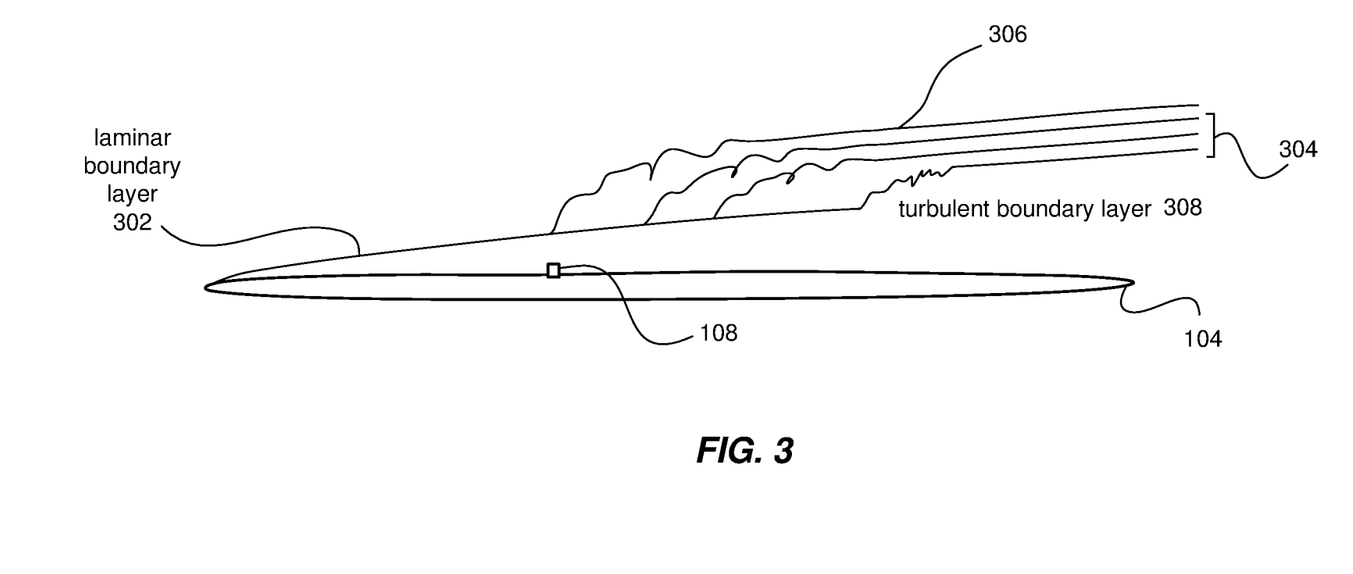
FIG. 3 is a diagram showing an airfoil or wing cross-section showing laminar and turbulent boundary layers in accordance with one embodiment.

FIG. 3 is a diagram showing an airfoil or wing cross-section 104 showing laminar and turbulent boundary layers in accordance with one embodiment. The boundary layers, trip device dimension, and wing cross-section dimension are not drawn to scale; they are enlarged for ease of illustration.

Shown are airfoil or wing cross-section 104 and a cross-section of trip device 108. The fore of wing cross-section 104 is at the left. This is where air first hits the wing which has laminar flow control. A laminar boundary layer 302 forms from the fore of the wing to the position of trip 108. Immediately aft of the position of trip 108, the air flow transitions to turbulent boundary layer 306. If the trip device was not present, the air flow would transition naturally to turbulent boundary layer positions 304 at different extreme load conditions which are farther downstream. In FIG. 3, three possible natural turbulent boundary layer transitions are shown. The different possible shock locations are not shown in FIG. 3. Generally, with the trip device, the shock line would be more upstream on the wing than it would be without the trip device.

FIG. 4 is a process flow diagram showing a method for determining an estimated best location of a trip device and for gathering test data in accordance with one embodiment. At step 402 low-drag design conditions for minimizing drag are identified for the airplane where laminar flow is targeted. These conditions are identified for low drag scenarios during cruise, Examples of these include Mach, altitude, weight, and other conditions. At step 404 transition positions for laminar flow to turbulent flow are predicted for each design condition. This will result in two or more locations on a chord-wise length of an airfoil where the air flow would naturally transition from laminar flow to turbulent flow. At step 406 the system identifies or determines envelope transition position that is most downstream along span of an airfoil considering low-drag design conditions. Referring to FIG. 2, it determines which design condition creates the most downstream path, similar to the trip device path that resembles continuous or discrete line 108 for the trip device in FIG. 2.

At step 408 a trip device is incorporated into the wing wherein the trip device (whether in the form of discrete elements or a continuous trip strip or edge, alone or in conjunction with vortex generators, or other means) is immediately aft of the most downstream position as determined in step 406. The distance between the most downstream position from step 406 and the trip device path may be determined using conventional means. As noted above, the position of the trip device (or transition position) on the chord-wise length of an airfoil from the wing may vary for each airfoil making up the wing. That is, the ratio of downstream length of a chord (aft of the trip device) to the upstream length can vary for each airfoil, resulting in a path that may look like trip 108 in FIG. 2.

At step 410 the system collects wind tunnel and other computational data of the wing with the trip device at the best estimated or predicted position as determined at step 408. These data can be used to determine whether the trip device has been positioned at a location that is best in light of critical or extreme load conditions. Adjustments to the trip position can be made accordingly and fine-tuned to account for critical load conditions and aerodynamic efficiency before actual flight testing occurs.

Figure 5:
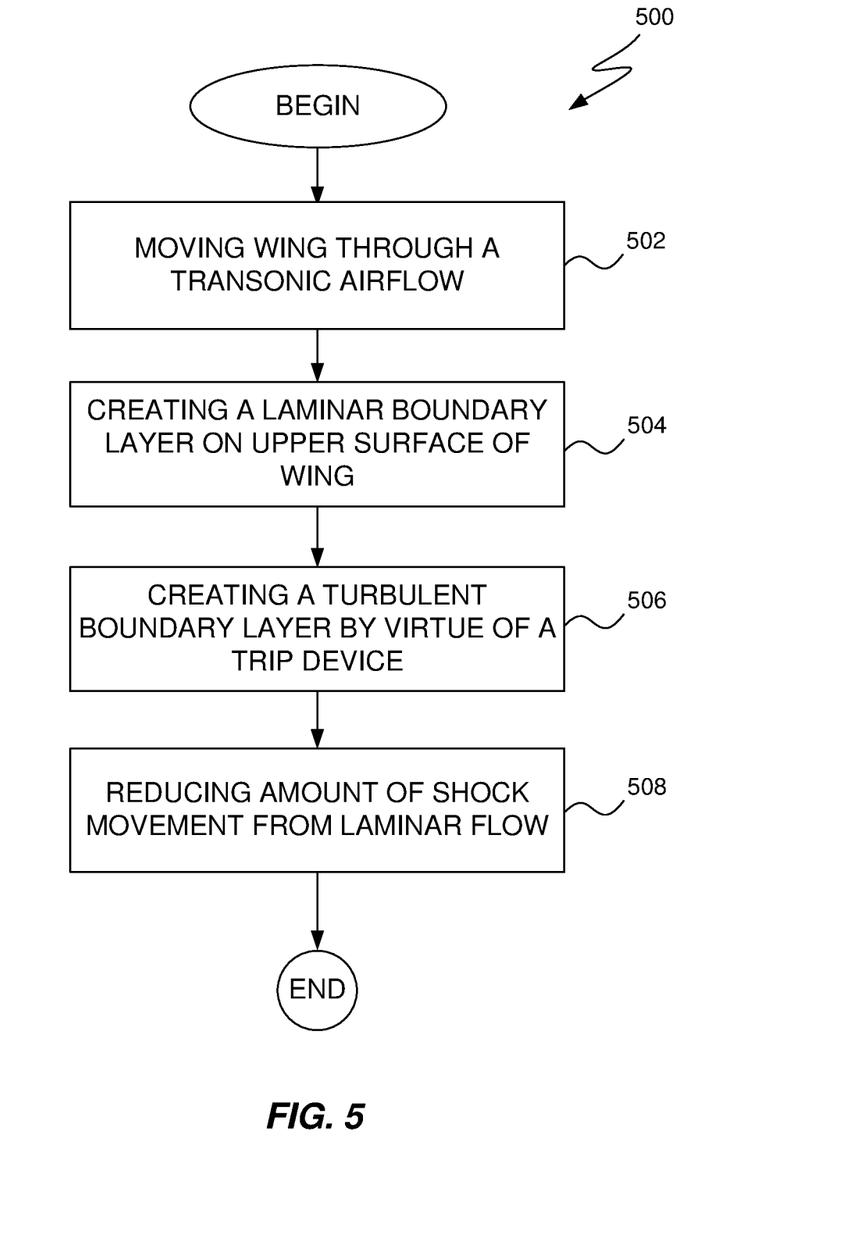
FIG. 5 is a flow diagram showing a process or operating an airplane having wings with a trip device located on an upper surface of a wing in accordance with one embodiment.

It is preferred that there be a high fidelity prediction of loads (sectional lifts), a priori, of flight testing. In one embodiment, loads are determined on a wing with the trip device already present at the best estimated location as determined by processes described in FIG. 4. It is possible to limit variability of aircraft control effectiveness and handling qualities by knowing better where to locate the trip device, FIG. 5 is a flow diagram of a process of operating an airplane having wings with a trip device located on an upper surface of a wing and according to processes described in FIG. 4 in accordance with one embodiment. At step 502 the airplane is in flight and its wings are moving through air. More specifically, the wings are moving through a transonic airflow. At step 504, movement of the wing through air creates a laminar boundary layer on the upper or lower surface of the wing starting at a leading edge of the wing. In another embodiment, the laminar boundary layer may be along a vertical surface. At step 506 laminar air flow transitions to a turbulent boundary layer as a result of a trip device on the surface of the wing. When looking at a chord of the wing, the length of the laminar boundary layer is a first length and the length of the turbulent boundary layer is a second length. The total chord length of an airfoil is the sum of the first length and the second length. At step 508 a shock may occur on the wing. This shock has less movement with changing flight conditions than would occur if the trip device had not been incorporated into the wing at the position determined via processes described in FIG. 4, As described above, the shock line is at a position on the wing that reduces the amount of low pressure on the upper surface (i.e., extending the amount of high pressure area on the upper surface) of the wing. This reduces the load on the wing in extreme conditions, Similar features may also apply to a lower surface of the wing or to either side of a vertically oriented wing.

Figure 6:
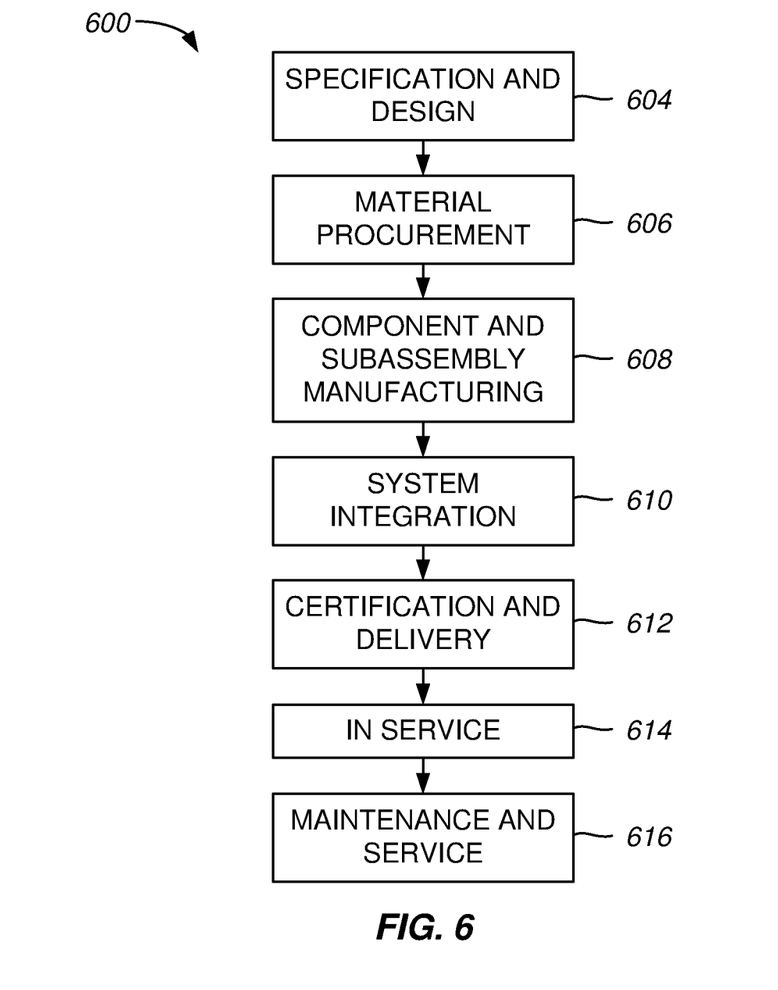
FIG. 6 is a flow diagram of an aircraft manufacturing and service method in accordance with one embodiment.

As discussed above, a fixed-location trip device 108 disclosed herein is used on a wing on aircraft 100. Accordingly, the manufacture of such appliances may be described in the context of an aircraft manufacturing and service method 600 as shown in FIG. 6 and aircraft 100 as shown in the figures, During pre-production, method 600 may include specification and design 604 of aircraft 100 and material procurement 606. During production, component and subassembly manufacturing stages 608 and system integration stage 610 of aircraft 100 takes place. Thereafter, aircraft 100 may go through certification and delivery 612 in order to be placed in service 614. While in service by a customer, aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

Figure 7:
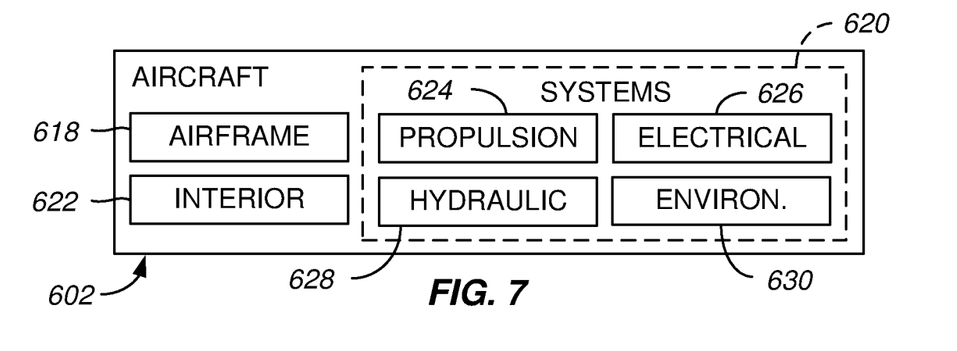
FIG. 7 is a block diagram showing components of an aircraft in accordance with one embodiment.

As shown in FIG. 7, aircraft 100 produced by method 600 may include an airframe 618 with high-level systems 620 and interior 622. Examples of high-level systems 620 include one or more of a propulsion system 624, an electrical system 626, a hydraulic system 628, and an environmental system 630. Although an aerospace example is shown, the principles of the examples described herein may be applied to other industries.

Devices and methods embodied herein may be employed during any one or more of the stages of method 600. For example, components or subassemblies corresponding to stages 608 and 610 may be fabricated or manufactured in a manner similar to components or subassemblies produced while aircraft 100 is in service. Also, one or more device examples, method examples, or a combination thereof may be utilized during stages 608 and 610, for example, by substantially expediting assembly of or reducing the cost of aircraft 100. Similarly, one or more of device examples, method examples, or a combination thereof may be utilized while aircraft 100 is in service, for example and without limitation, for maintenance and service 616.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, different combinations of elements and/or functions may be provided by alternative implementations without departing from the scope of the appended claims. Accordingly, parenthetical reference numerals in the appended claims are presented for illustrative purposes and are not intended to limit the scope of the claimed subject matter to the specific examples provided in the present disclosure.

What is claimed is:

1. A method of enhancing operation of an aircraft, the method comprising:
   moving a wing having a fixed-location trip device along a span of the wing through an airflow such that air passing over a wing surface creates a laminar boundary layer; and
   creating a turbulent boundary layer when the airflow is downstream of the fixed-location trip device, wherein the laminar boundary layer extends for a first length and the turbulent boundary layer extends for a second length, wherein the fixed-location trip device extends spanwise along an upper surface of the wing at a position that is just aft of a most downstream position for transitioning from a laminar to turbulent flow under a plurality of cruise conditions without the trip device, such that the trip device's position enables laminar flow for the first length to increase aerodynamic efficiency and enables turbulent flow for the second length to decrease loads on the wing, thereby providing a fixed aft limit on a transition from laminar boundary layer to turbulent boundary layer,
   wherein the trip device's position is determined by:
      predicting a plurality of target transition locations under a plurality of design conditions including the plurality of cruise conditions without the trip device, wherein each target transition location is a location where airflow transitions from a laminar boundary layer to a turbulent boundary layer, and
      identifying the most downstream target transition location from the plurality of target transition locations as the position of the trip device, so as to limit downstream movement of transitions from a laminar boundary layer to a turbulent boundary layer under non-cruise conditions.

2. The method as recited in claim 1, wherein the trip device's position extends continuously spanwise along a curved line.

3. The method as recited in claim 1, wherein the cruise conditions include a plurality of different speeds, altitudes, and weights.

4. The method as recited in claim 1 further comprising:
reducing shock movement on the wing wherein the fixed-location trip device reduces downstream movement of the transition and an associated movement of shock location on the wing during transonic airflow.

5. The method as recited in claim 1, wherein the trip device's position decreases variation of aerodynamic forces between flight conditions, and wherein the flight conditions comprise cruise conditions and extreme load conditions.

6. The method as recited in claim 1, wherein a vertically oriented wing comprises a second fixed-location trip device.

7. A method of manufacturing a wing comprising:
along a chordwise direction of an airfoil surface of the wing, predicting a plurality of target transition locations under a plurality of design conditions including a plurality of cruise conditions without a trip device, wherein each target transition location is a location where airflow transitions from a laminar boundary layer to a turbulent boundary layer;
identifying a most-downstream target transition location from the plurality of target transition locations, so as to limit downstream movement of transitions from a laminar boundary layer to a turbulent boundary layer under non-cruise conditions; and
incorporating a trip device along a spanwise direction of the wing at a position that is just aft of the most-downstream target transition location to enable turbulent flow, wherein the trip device extends spanwise along an upper surface of the wing.

8. The method as recited in claim 7, wherein a trip device's position location decreases variation of aerodynamic forces between flight conditions, wherein the flight conditions comprise cruise conditions and extreme load conditions.

9. An aircraft wing comprising:
a trip device along a span of the wing to enable turbulent flow, wherein a trip device extends spanwise along an upper surface of the wing at a position that is just aft of a most downstream position for transitioning from a laminar to turbulent flow under a plurality of cruise conditions without the trip device,
wherein the trip device's position prevents downstream movement of the transition from laminar flow to turbulent flow, and
wherein the trip device's position is determined by:
predicting a plurality of target transition locations under a plurality of design conditions including the plurality of cruise conditions without the trip device, wherein each target transition location is a location where airflow transitions from a laminar boundary layer to a turbulent boundary layer, and
identifying the most downstream target transition location from the plurality of target transition locations as the position of the trip device, so as to limit downstream movement of transitions from a laminar boundary layer to a turbulent boundary layer under non-cruise conditions.

10. The aircraft wing as recited in claim 9, wherein the trip device's position decreases variation of aerodynamic forces between flight conditions.

11. The aircraft wing as recited in claim 9, wherein the flight conditions comprise cruise conditions and extreme load conditions.

12. The method as recited in claim 1, wherein the wing comprises:
a first end coupled to a fuselage of the aircraft; and
a second end that is a tip of the wing,
wherein the trip device extends continuously from the first end to the second end.

13. The method as recited in claim 7, wherein the wing is a wing of an aircraft.

14. The method as recited in claim 13, wherein the wing comprises:
a first end coupled to a fuselage of the aircraft; and
a second end that is a tip of the wing.

15. The method as recited in claim 14, wherein the trip device extends continuously from the first end to the second end.

16. The aircraft wing as recited in claim 9, wherein a first end of the wing is configured to couple to an aircraft and wherein a second end of the wing is a tip of the wing.

17. The aircraft wing as recited in claim 16, wherein the trip device extends continuously from the first end to the second end.

18. The method as recited in claim 7, wherein the trip device's position extends continuously spanwise along a curved line.

19. The method of claim 7, further comprising:
in a wind tunnel under a plurality of extreme load conditions, testing the wing with the trip device at the position to determine whether the trip device's position is to be adjusted for at least one of the extreme load conditions; and
adjusting the position of the trip device if it is determined that the trip device's position is to be adjusted for at least one of the extreme load conditions.

20. The method of claim 1, wherein the trip device's position is further determined by:
in a wind tunnel under a plurality of extreme load conditions, testing the wing with the trip device at the position to determine whether the trip device's position is to be adjusted for at least one of the extreme load conditions; and
adjusting the position of the trip device if it is determined that the trip device's position is to be adjusted for at least one of the extreme load conditions.

* * * * *